US006966229B2

United States Patent
Seeberg (10) Patent No.: US 6,966,229 B2
(45) Date of Patent: Nov. 22, 2005

(54) PRESSURE SENSOR (75) Inventor: Björn Erik Seeberg, Oslo (NO)

(73) Assignee: Presens AS, Oslo (NO)

( * ) Notice: Subject to any disclaimer, the term of this patent is extended or adjusted under 35 U.S.C. 154(b) by 0 days.

(21) Appl. No.: 10/483,398

(22) PCT Filed: Jul. 11, 2002

(86) PCT No.: PCT/NO02/00257
§ 371 (c)(1), (2), (4) Date: Jan. 12, 2004

(87) PCT Pub. No.: WO03/014690
PCT Pub. Date: Feb. 20, 2003

(65) Prior Publication Data
US 2004/0159160 A1 Aug. 19, 2004

(30) Foreign Application Priority Data
Jul. 13, 2001 (NO) .......................................... 20013509

(51) Int. Cl.$^7$ ................................................ G01L 9/00
(52) U.S. Cl. ....................................................... 73/754
(58) Field of Search ........................... 73/754, 700–727, 73/729.2, 756

(56) References Cited

U.S. PATENT DOCUMENTS

| 4,481,497 A | 11/1984 | Kurtz et al. |
| 4,535,631 A | 8/1985 | Sinha et al. |
| 4,984,467 A | 1/1991 | Haefner |
| 5,024,098 A * | 6/1991 | Petitjean et al. ........... 73/729.2 |
| 5,107,710 A | 4/1992 | Huck et al. |
| 5,744,727 A | 4/1998 | Hanneborg et al. |
| 5,861,558 A | 1/1999 | Buhl et al. |
| 6,145,383 A * | 11/2000 | Meringdal et al. ............ 73/727 |

FOREIGN PATENT DOCUMENTS

| EP | 0373010 | 6/1990 |
| WO | 9732190 | 9/1997 |

* cited by examiner

Primary Examiner—William Oen
Assistant Examiner—Alandra Ellington
(74) Attorney, Agent, or Firm—Wenderoth, Lind & Ponack, L.L.P.

(57) ABSTRACT

A pressure gauge is arranged to function on the outside of a measuring element. The measuring element has a central cavity and is constituted by at least to parts, which are tightly joined for creation of the cavity. The measuring element has sensor organs for determining the mechanical state of stress of the measuring element during pressure influence. The two parts of the measuring element are manufactured with planar techniques, preferably by silicon or quarts with the cavity running in the longitudinal direction. The central cavity has a considerably greater height than width. The sensor organs have form of piezo-resistive elements arranged near an outer surface of the measuring element.

18 Claims, 7 Drawing Sheets

PRESSURE SENSOR

The present invention concerns pressure sensors manufactured with planar techniques. The invention especially concerns a pressure gauge preferably arranged to function on the outside of a measuring element. The measuring element has a central cavity running in the longitudinal direction of the measuring element which is composed of at least two parts which are tightly joined for creation of the cavity. Piezo-resistive elements are used to register the mechanical state of stress of the measuring element during pressure influence.

BACKGROUND

A pressure gauge consists in principle of a spring element (measuring element) is and a measuring or sensor organ. Common commercially available pressure gauges based on silicon technology may use membranes as the spring element, provided with piezo-resistive resistors as the sensor organs. Such membrane sensors have a typical size of 3 mm×4 mm. Spring elements like membranes are disadvantageous for high pressures because such elements are susceptible for effects related to restraining to a substrate with transition to materials with different modules of elasticity. The tension detected on such membranes will be a combination of pressure and tensile stresses. If the tensile stress becomes adequately high, breakage may occur. At large deformations, the stress in the membrane will not be linearly dependent of the pressure, providing a non-linear signal.

The closest prior art in this connection is described in Norwegian Patent NO 304 328 describing a pressure gauge particularly for very high pressures. The measuring principle that is used is described in the book "Instrumenteringsteknikk" by Ole A. Solheim, Tapir forlag Trondheim 1966, and uses piezo-resistive elements arranged on the outside of the measuring element for detecting tensile stress appearing in the measuring element. The two parts of the measuring element are manufactured with planar techniques, preferably of silicon or quartz, and have a considerably greater length than transverse dimension, with the cavity running in the longitudinal direction. The pressure gauge is, however, especially suitable for measuring very high pressures.

The present invention represents a further development of the sensor described in the Norwegian Patent NO 304 328 to lower pressure ranges.

SUMMARY OF THE INVENTION

In a first aspect, the invention concerns a pressure gauge comprising a measuring element having a longitudinal direction and a central cavity that extends in this longitudinal direction. The measuring element is constituted by at least two parts, manufactured in planar technique and preferably of silicon or quarts, and they are tightly joined for creation of the cavity. The two parts are joined in a joining plane. The measuring element comprises sensor devices in the form of piezo-resistive elements for sensing the mechanical state of stress of the measuring element under pressure influence. The piezo-resistive elements are arranged on a surface of the two parts parallel with the joining plane. The pressure gauge in accordance with the invention is characterized in that a cross section of the central cavity has a considerably greater height than width, the height of the cross section being defined as the direction perpendicular to the joining plane. Further, the width of the cross section is perpendicular to the height, and of the central cavity is at least of the magnitude five times the width.

In a preferred embodiment, the height of the central cavity is at least of the magnitude five times the width. The central cavity may comprise two single canals running in the longitudinal direction of the measuring element and which are arranged side by side. The cavity is constituted by an upper part and a lower part, where the upper and the lower parts are complementary. The cavity may also be constituted of two parts providing a cross section with effectively three layers. The three layers constitute an upper part, a lower part and a central part, where the upper and lower parts are complementary, and the central part is inserted to increase the height of the cavity in relation to the width. The cavity may also in another embodiment be constituted of parts creating a cross section with effectively four layers.

In a further embodiment, the upper and the lower parts are identical in at least as concerns the cross sectional form and the cavity is created by reactive ion-etching (RIE) in those parts of the surface facing the other part. The outer cross section form of the measuring element may, for example, be hexagonal, octagonal or decagonal and symmetrical about two longitudinal planes, but alternatively it can also be shaped as a hexagonal and be symmetrical about two longitudinal planes. Two of the parts constituting the measuring element may also be identical in at least as concerns the cross-sectional shape. The parts of the measuring element may be joined by anodic bonding, or by so-called direct bonding. The pressure gauge can be designed for measuring full scale pressure in the range 0.5–100 bar.

The pressure gauge according to the invention is stated in the appended patent claims.

The sensor provides large and robust signals which result in that it can be connected to cheaper and simpler electronics. It will also have a considerably less area and thereby be cheaper to produce.

BRIEF DESCRIPTION OF DRAWINGS

The invention shall now in the following be further explained in the form of different example embodiments shown in the drawings, where.

DETAILED DESCRIPTION

Figure 1:
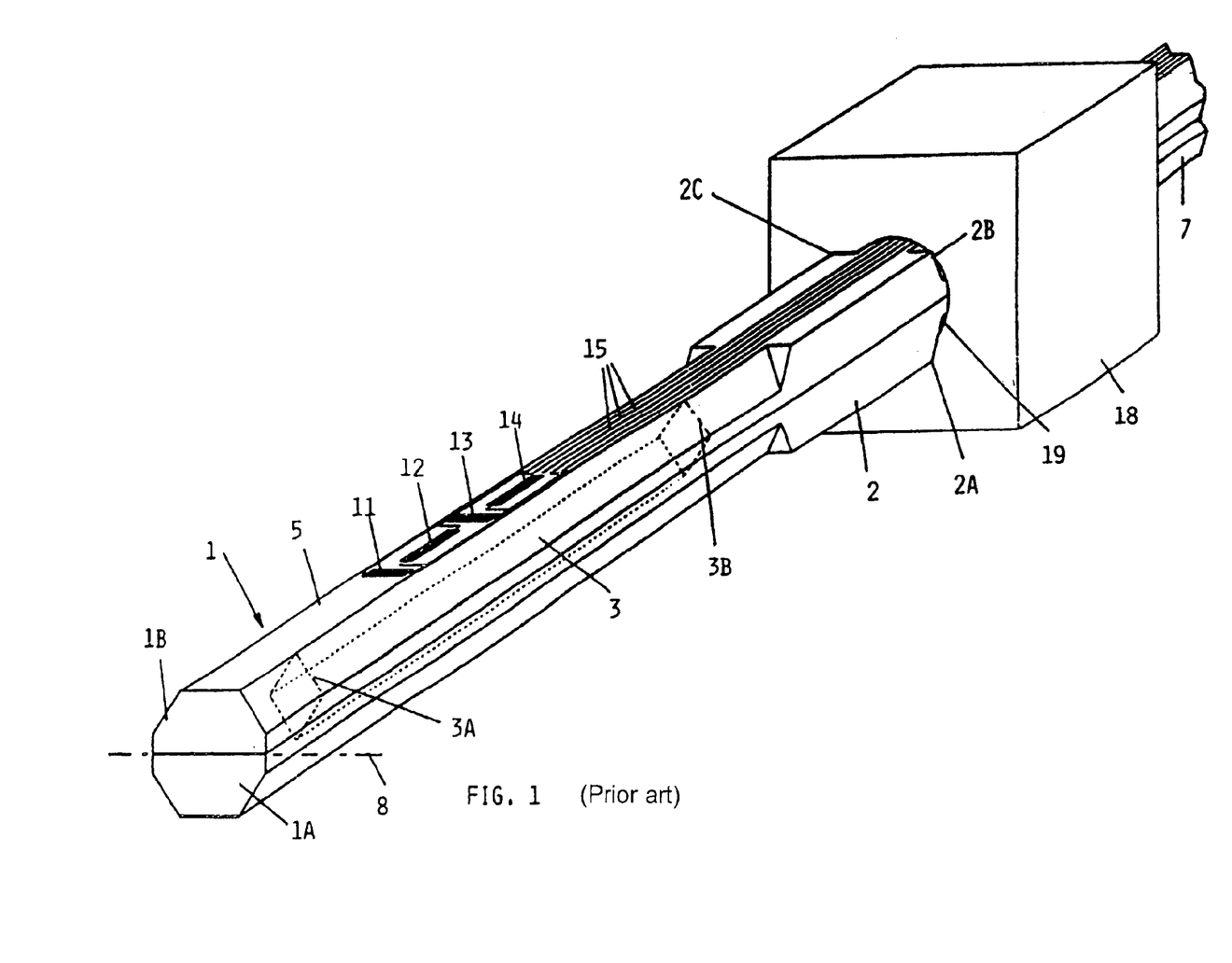
FIG. 1 represents prior art and shows in perspective an embodiment of a pressure gauge (measuring element) mounted in a holder.

FIG. 1 shows the closest prior art and shows an example embodiment of the sensor in NO 304 328. An extended measuring element 1 is constituted by two parts 1A and 1B which are identical and which together create an internal cavity 3 between two end walls 3A and 3B. The cavity 3 does not distend completely out to the ends of the main part of the measuring element 1, which is here shown with an octagonal cross section.

A surface 5 of the measuring element is provided with sensor organs 11, 12, 13 and 14, which through a number of conductors 15 are connected with external electronics or measuring circuits. The sensor organs 11, 12, 13 and 14 have form of in themselves known piezo-resistive elements which preferably are arranged in a bridge connection. The sensor is sensitive to changes in the mechanical state of tension of the measuring element or deformation when it is exposed to varying pressure difference between the surroundings and the internal cavity 3.

At its internal end, the octagonal main part 1 of the measuring element verges into a support part 2 having a quadratic external cross section profile, aiming at interacting with a mounting piece 18 in which the whole measuring element is mounted. The mounting piece 18 has accordingly a throughgoing hole 19, which is preferably circular, and which is adapted to a bushing part 7 on the measuring element. The part 7 has advantageously the same external cross section profile as the main part 1. The support part 2 serves to give a safe anchoring of the measuring element against the mounting piece 18, which has particular interest when the measuring element is exposed to very high external pressures. Such pressures will seek to press the measuring element 1 in axial direction into the hole 19, but the outranging corners 2A, 2B, 2C and 2D (see also FIG. 2A) will effectively block against displacement of the measuring element during such pressure influence. Through the hole 19 the bushing part 7 may be further fixed by using appropriate glue filling out the space between the octagonal cross section and the circular hole 19.

Figure 2A:
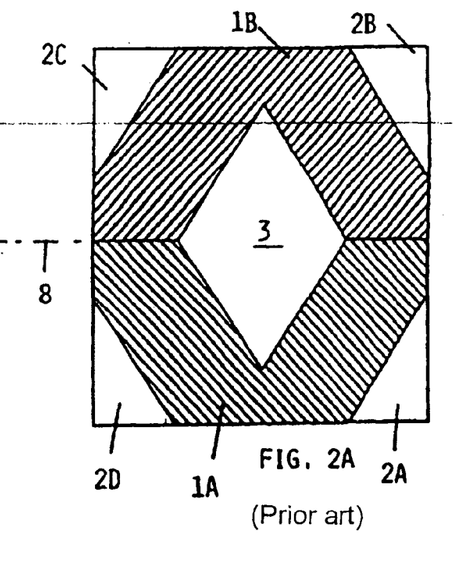
FIG. 2A shows an enlarged cross section of the main part of the measuring element in FIG. 1.
Figure 2B:
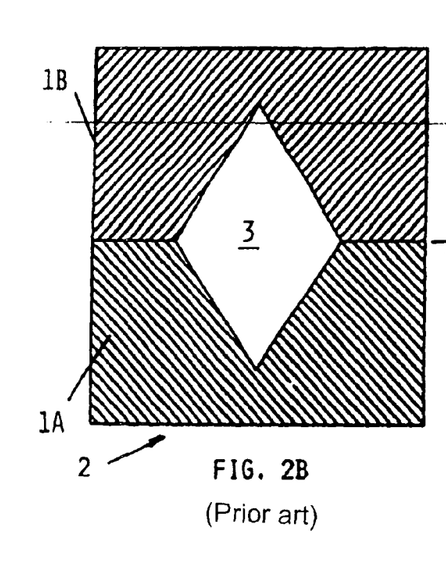
FIG. 2B shows in an enlarged cross section a support part of the measuring element in FIG. 1, close to the holder.
Figure 3:
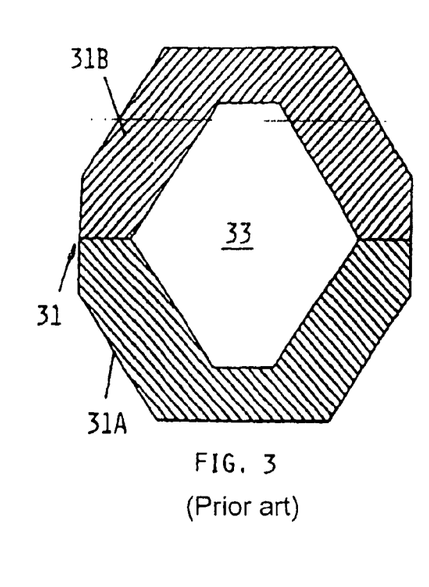
FIG. 3 shows in a corresponding cross section as in FIGS. 2A and 2B, a variant of the cross section form of the measuring element, that is the cross section of the cavity.

FIGS. 2A, 2B and 3 show in more detail different embodiments of the cross section of the known measuring element in FIG. 1. The two parts 1A and 1B are joined in the plane marked with 8. The four corners 2A, 2B, 2C and 2D in FIG. 1A serve to anchor against the holder 18. The quadratic external cross section profile on FIG. 2B corresponds to the cross section in the support part 2, but the internal cavity 3 does not really exist in the support part 2 when absolute pressure measurement is concerned, i.e., with a closed cavity 3 between end walls 3A and 3B as in FIG. 1. In that respect, FIG. 2B may be regarded illustrative of an alternative main form of the effective length of a measuring element 1, where the cavity 3 may have the same cross section form as in FIG. 2A and 1. It is thus favorable to design the cavity 3 in the known measuring element with a rhombic cross section having two corners located in the joining plane 8 between the two parts 1A and 1B.

FIG. 3 shows a variant where the outer cross section contour of the measuring element 31 is the same as in FIG. 2A, that is octagonal, whereas the inner cavity 3 has a hexagonal cross section profile. This is, like the cavities 3, having a rhombic shape, well suited for manufacture in planar techniques, particularly by etching. In addition to a quadratic and octagonal outer cross section contour, the known measuring element may be produced with a polygonal external cross section profile in other variants, like a hexagonal cross section.

The known pressure gauge described above is, however, particularly adapted to high pressures.

The present invention represents a further development of the pressure gauge described in the Norwegian Patent NO 304 328, and which is described above. The pressure gauge according to the invention may be used in lower pressure ranges, that is in the area 0.5–100 bar. The invention consists mainly in a change of the geometry of the cavity's cross section, to a cavity which in cross section has essentially a greater height than width. Embodiments of the invention will now be described.

Figure 4:
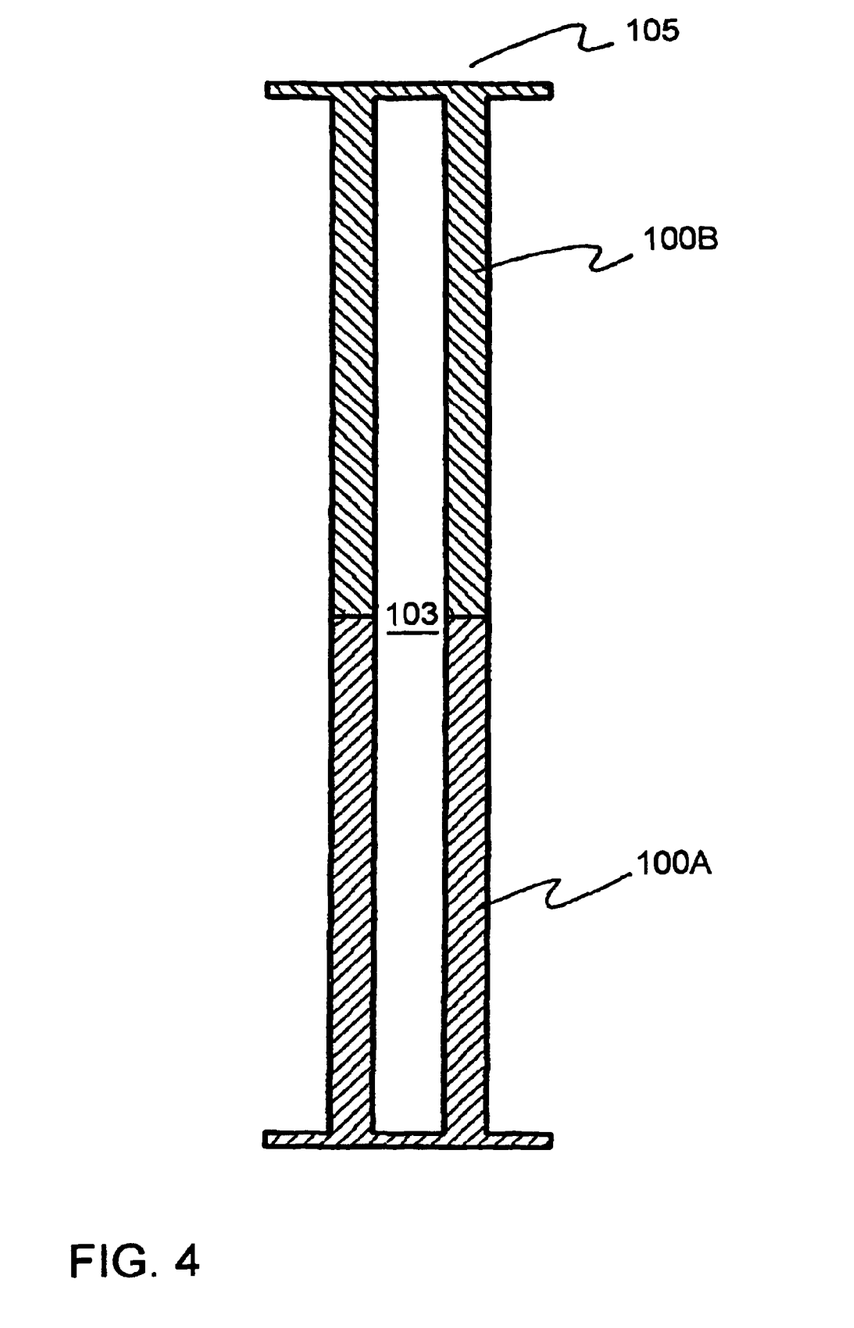
FIG. 4 shows an enlarged cross section of the main part of the measuring element according an embodiment of the invention designed for measuring low pressures.

FIG. 4 shows a first embodiment of the cavity in the measuring element according to the invention. The cavity has a rectangular cross section form, but with essentially a greater height than width. The measuring element is constructed by two parts 100A and 100B which are identical and which together form the inner cavity 103. The external form of the measuring element is in the embodiment shown in FIG. 4, polygonal. The surface 105 extends beyond the elongated side walls defining the height of the measuring element. This construction provides space for the sensor organs on the outside of the measuring element as in the known embodiment in FIG. 1. The minimum outer width of the measuring elements may be about 100 $\mu$m to be able to get enough space to be able to locate conductors 15. Here, also used are piezo-electrical elements in bridge connection as sensor organs as in the known embodiment in FIG. 1. A typical size of the cavity will, in accordance with the present invention, be a height of 4–6 mm and a width of 200 $\mu$m, but the width may be reduced, for example, 100 $\mu$m. The height should be at least be five times the width of the cavity to be able to achieve the desired effect. The side walls in this modified cavity will, when the measuring element is exposed to pressure influence, be forced inwards. This brings about that the outer surfaces of the two ends will cause considerably influence on the sensor organs 15 arranged on the outside of the measuring element on these end surfaces. The measuring element according to the invention is, however, still essentially longer than its width, and the length may be in the magnitude 100 times the width. As mentioned, the width is determined to a great extent by the sensor organs which shall be arranged on the outside of the measuring element. If piezo-resistive elements are used as sensor organs, a typical magnitude of the signals in the pressure range 0.5–100 bar would be about 40 mV/Vbar. This is an essential greater signal than what can be achieved with the known embodiment shown in FIGS. 1–3, which has a maximum of 1 mV/Vbar. The mounting of the measuring element may, for example, be performed as shown in FIG. 1 for the known sensor designed for very high pressures.

Figure 5:
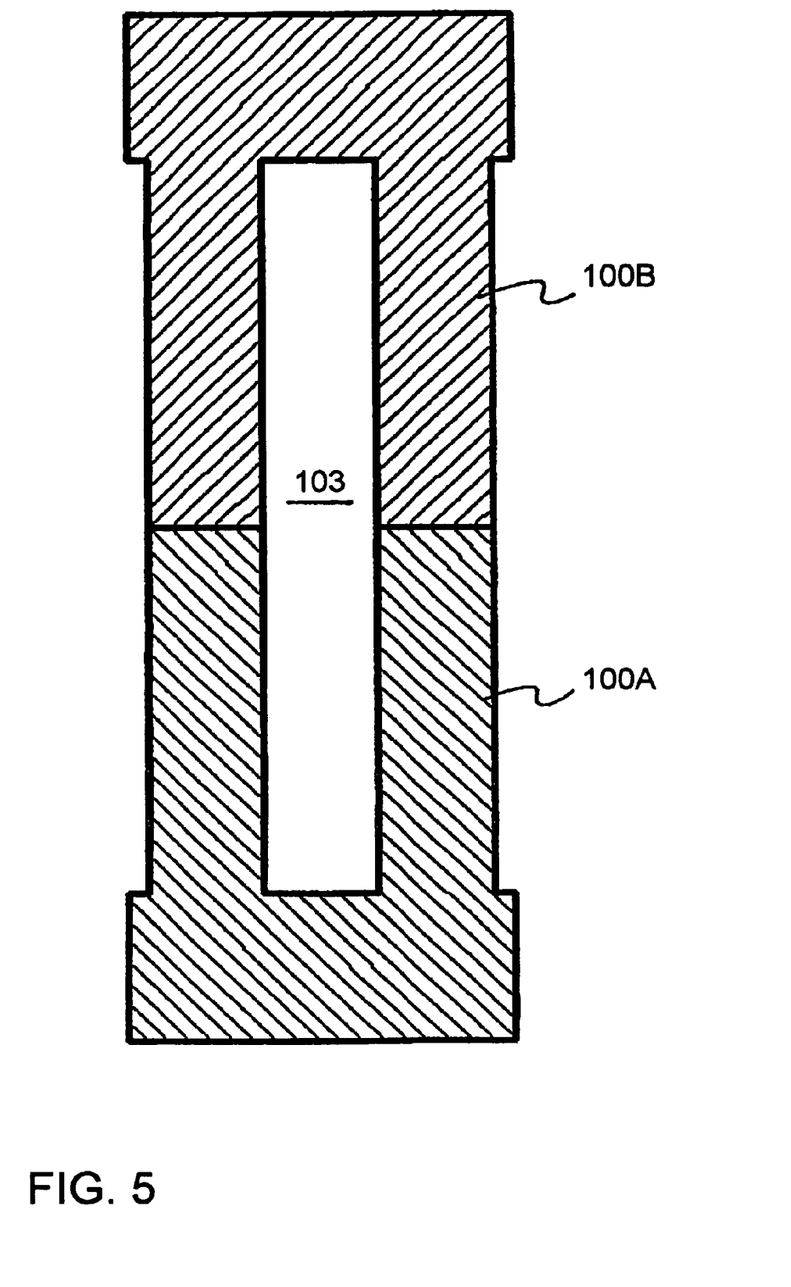
FIG. 5 shows an enlarged cross section of the main part of the measuring element according to a further embodiment of the invention designed for measuring high pressures.

In FIG. 5, it is shown another embodiment of the cavity especially for measuring higher pressures. Here, the relationship between the height and width is reduced in relation to the embodiment shown in FIG. 4.

Figure 6:
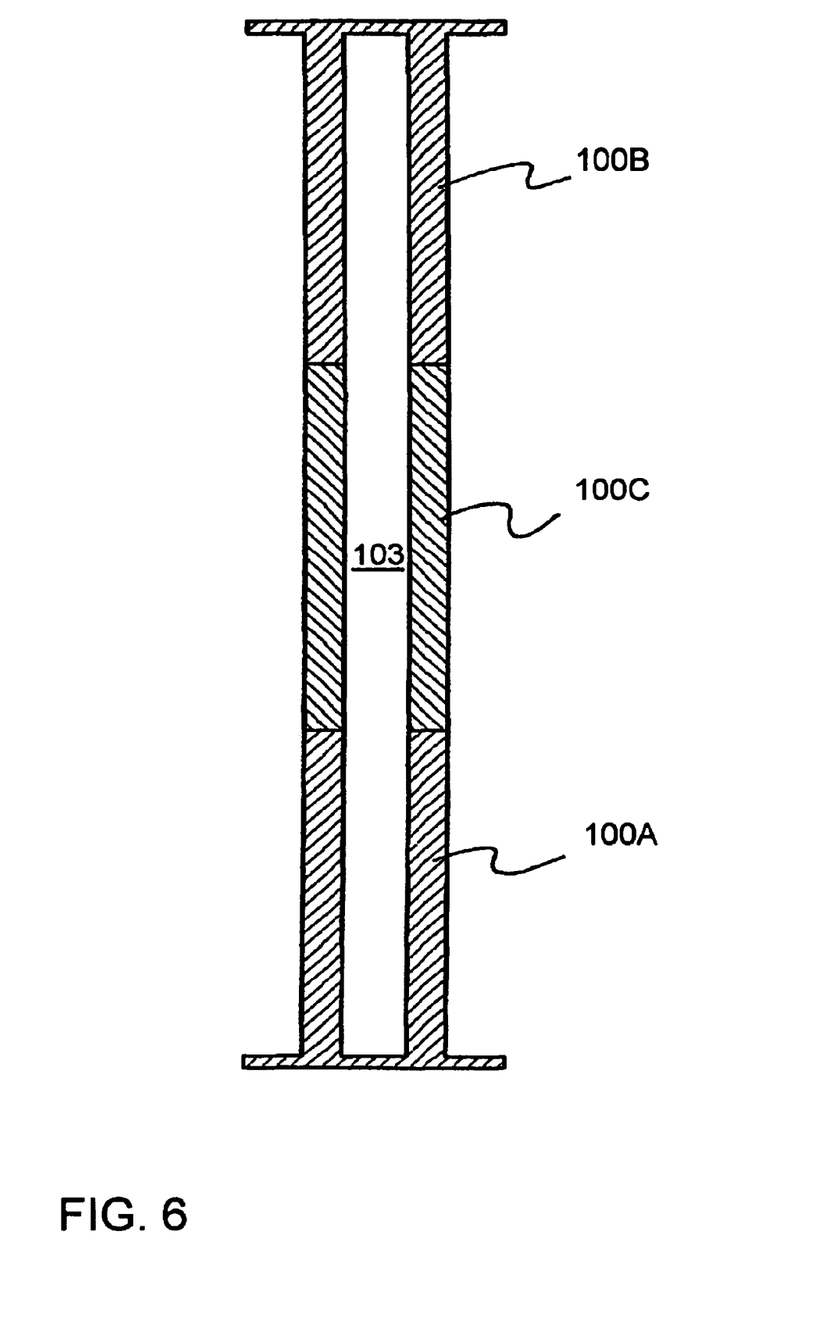
FIGS. 6–8 show variants of a cross section shape according to the invention.
Figure 7:
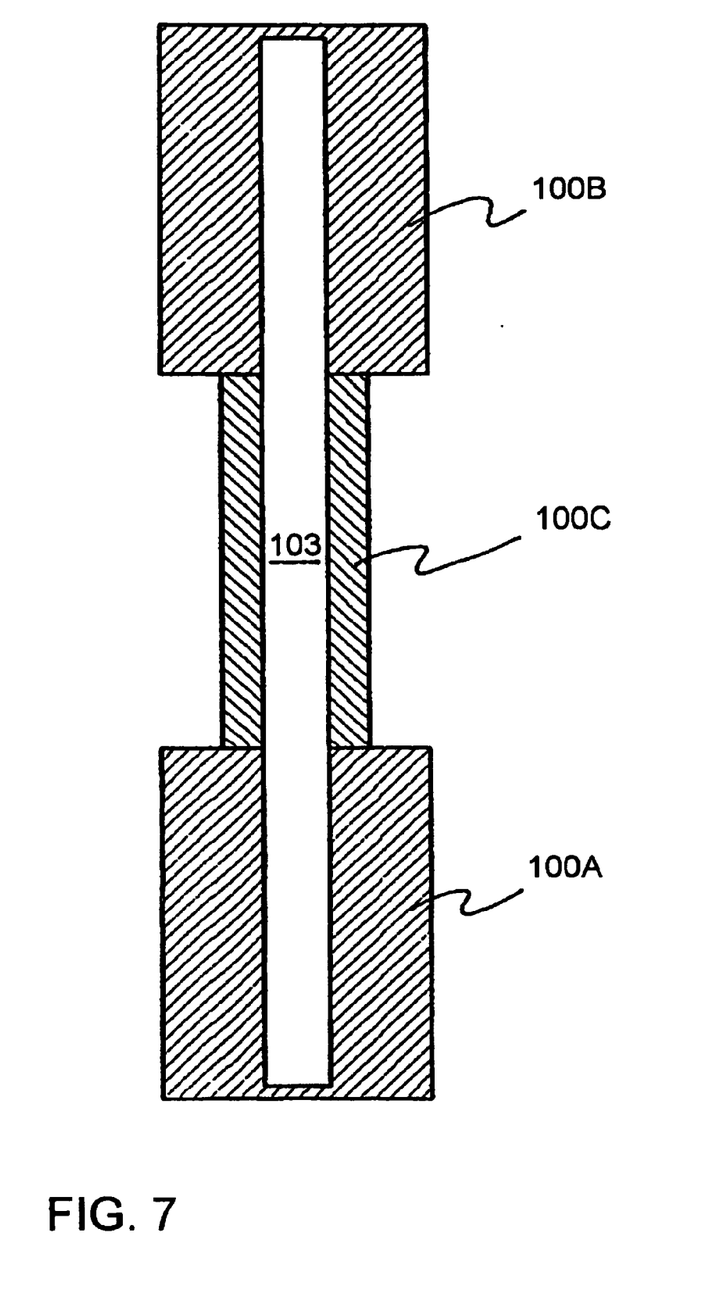
Figure 8:
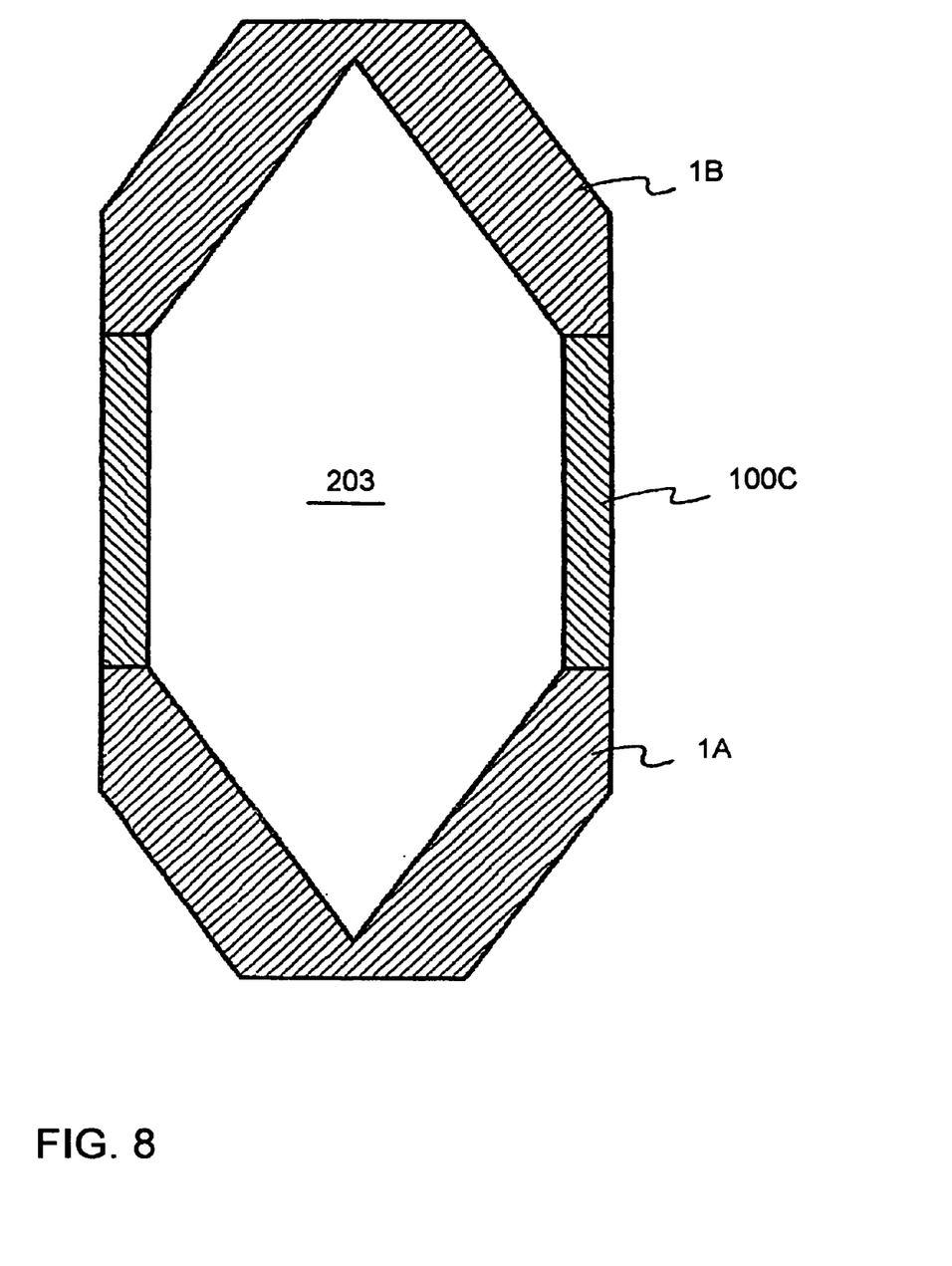

FIGS. 6 and 7 show alternative embodiments of the present invention. In FIG. 6, the height is increased by inserting a third intermediate part 100C between the two main parts 100A and 100B. Such an intermediate part may also be inserted in the known embodiment shown in FIGS. 1, 2A, 2B and 3 to achieve a considerably greater height than width. This embodiment is shown in FIG. 8. Here, an hexagonal inner cavity 203 is achieved, while the outer geometrical form becomes octagonal.

FIG. 7 shows another alternative embodiment of the present invention where an intermediate part is included to increase the height of the cavity 103 in relation to the width of the measuring element. Here, the side walls of the intermediate part are thinner than the side walls of the upper and lower parts, but the inner shape of the cavity is rectangular. The outer geometrical form of the measuring element is bihexagonal. The height may be further increased by further intermediates inserted in between the upper 100B and lover 100A parts. The cross section of the measuring element will then be constituted by at least four layers.

In an alternative embodiment, the cavity 103 may be equipped with an internal partition for creation of two cavities. The two cavities form two single canals which run side by side in the longitudinal direction of the measuring element. The height of the cavities must be considerably greater than the sum of the width of the two cavities.

The well shaped, deep cavity in the present invention can be produced by the use of reactive ion-etching (RIE). This is a complexed technique where well-formed depressions are first etched in the element, and then coated with a protective film. This protective film is removed by physical etching on selected locations and the cavity may thus be made deeper. RIE is a known technique which makes it possible to etch a recess in a planar element where the depths are considerably greater than the width.

Based on planar technique, the at least two parts constituting the measuring element may be joined as mentioned by, for example, use of anodic bonding or so-called direct bonding (fusion bonding). The parts can also be joined by use of suitable glue.

The width of the measuring element is decided as mentioned by conductors and wiring points which must have space on the outside of the narrow upper end surfaces of the element. This provides a lower limit for how narrow the measuring element may be, and this limit is with today's technology about 100 $\mu$m.

In connection with mounting, packing and encapsulation of the measuring element, it is clear that this element may be provided with a protecting film on the surface, an example given at $Si_3N_4$ possibly polyamide plastic, in such a way that the measuring element may be exposed directly for the actual pressure medium.

Several other modifications and variants are also possible within the frame of the invention, perhaps especially connected to the wish of achieving rational and economical production processes. An example given the parts of the measuring element in themselves may consist of a complex structure containing layers of different material types. Further, a possible modification may consist in that the sensor organs can be arranged on more than one surface of the measuring element, for example, on two oppositely directed main surfaces.

What is claimed is:

1. A pressure gauge comprising:
    a measuring element comprising at least two parts joined at a joining plane such that a central cavity running in a longitudinal direction of said measuring element is formed; and
    a plurality of sensor devices operable to sense a mechanical state of stress of said measuring element under pressure influence, said plurality of sensor devices being arranged on a surface of said measuring element parallel with the joining plane,
    wherein a cross section of the central cavity has a height at least five times greater than a width, the height of the cross section being defined as a direction perpendicular to the joining plane, and the width of the cross section being perpendicular to the height.

2. A pressure gauge according to claim 1, wherein the central cavity comprises two single canals running in the longitudinal direction of said measuring element and which are arranged side by side.

3. A pressure gauge according to claim 1, wherein said at least two parts is four parts, thereby creating a cross section with four layers.

4. A pressure gauge according to claim 1, wherein an external cross section shape of said measuring element is hexagonal, octagonal or decagonal and symmetrical about two longitudinal planes.

5. A pressure gauge according to claim 1, wherein the cross section of the central cavity is rectangular and symmetrical about two longitudinal planes.

6. A pressure gauge according to claim 1, wherein the cross section of the central cavity is hexagonal and symmetrical about two longitudinal planes.

7. A pressure gauge according to claim 1, wherein two parts of the at least two parts of the measuring element have a same cross section shape.

8. A pressure gauge according to claim 1, wherein said at least two parts of said measuring element are joined by anodic bonding or by direct bonding.

9. A pressure gauge according to claim 1, wherein said measuring element and said plurality of sensor devices are adapted for measurement of full-scale pressures in a range of 0.5–100 bar.

10. A pressure gauge according to claim 1, wherein said plurality of sensor devices are piezo-resistive elements.

11. A pressure gauge according to claim 1, wherein said at least two parts each comprise silicone or quartz.

12. A pressure gauge according to claim 1, wherein said at least two parts are each manufactured with a planar technique.

13. A pressure gauge according to claim 1, wherein said plurality of sensor devices are piezo-electric elements.

14. A pressure gauge according to claim 1, wherein said at least two parts are an upper part and a lower part, said upper part and said lower part being complementary.

15. A pressure gauge according to claim 14, wherein said upper and lower parts have a same cross section profile and the central cavity is created by reactive ion-etching surfaces of said upper and lower parts facing each other.

16. A pressure gauge according to claim 1, wherein said at least two parts is three parts, thereby creating a cross section with three layers.

17. A pressure gauge according to claim 16, wherein said three parts an upper part, a lower part and an intermediate part, said upper part and said lower part being complementary, and said intermediate part being inserted to increase the height of the central cavity in relation to the width.

18. A pressure gauge according to claim 17, wherein said upper and lower parts have a same cross section profile and the central cavity is created by reactive ion-etching surfaces of said upper and lower parts facing each other.

* * * * *